United States Patent
Yamada

(10) Patent No.: US 7,286,738 B2
(45) Date of Patent: Oct. 23, 2007

(54) WHITE LIGHT PULSE GENERATING METHOD USING NONLINEAR OPTICAL DEVICE

(75) Inventor: Hirohito Yamada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/090,835

(22) Filed: Mar. 25, 2005

(65) Prior Publication Data

US 2005/0213905 A1   Sep. 29, 2005

(30) Foreign Application Priority Data

Mar. 25, 2004 (JP) .............................. 2004-089206

(51) Int. Cl.
*G02B 6/26* (2006.01)
(52) U.S. Cl. ........................................ 385/122; 385/27
(58) Field of Classification Search ................ 385/122, 385/129–132
See application file for complete search history.

(56) References Cited

U.S. PATENT DOCUMENTS 6,856,737 B1 * 2/2005 Parker et al. ............... 385/122

2003/0044159 A1 * 3/2003 Anderson et al. .......... 385/142
2004/0165850 A1 * 8/2004 Noda et al. ................. 385/129

FOREIGN PATENT DOCUMENTS

| EP | 1380861 A2 * | 1/2004 |
|---|---|---|
| JP | 2003-215367 | 7/2003 |
| JP | 2003-322737 | 11/2003 |

* cited by examiner

*Primary Examiner*—Sarah Song
(74) *Attorney, Agent, or Firm*—Young & Thompson

(57) ABSTRACT

A nonlinear-optic waveguide device has a thin-wire optical waveguide including a core having a cross-sectional area of at most 1 $\mu m^2$ and a cladding, the core and the cladding having a refractive index difference of at least 1. A light pulse introduced into the core has a peak power of at least several hundreds W and a pulse duration of at most 10 ps. The thin-wire optical waveguide has a length of about 1 cm. The nonlinear optical device, a mode-locked semiconductor laser, and tunable optical filter are combined into a white pulse light source.

22 Claims, 11 Drawing Sheets

Diameter of about 2μm central waveguide region of lower cladding 61 is removed central waveguide regions of lower cladding 71 and upper cladding 73 are removed

WHITE LIGHT PULSE GENERATING METHOD USING NONLINEAR OPTICAL DEVICE

BACKGROUND OF THE INVENTION

1. Field of the Invention

The present invention relates to the generation of white light pulses and the wavelength conversion of light pulses using a nonlinear optical device.

2. Description of the Related Art

Heretofore, it has been known to generate white light pulses by introducing light pulses into an optical fiber such as a highly nonlinear optical fiber or a photonic crystal optical fiber (also called a holey fiber) to generate supercontinuum light (While an applied light pulse is propagating through a medium, it is subjected to self-phase modulation due to a nonlinear optical effect, and its spectrum is continuously spread in a very wide wavelength range. The light pulse with the spread spectrum is called supercontinuum light). The wavelength conversion of light pulses is realized by extracting light pulses having a desired wavelength from supercontinuum light with a tunable optical filter. Details of such a process are disclosed in William J. Wadsworth, Arturo Ortigosa—Blanch, Jonathan C. Knight, Tim A. Birks, T. P. Martin Man, and Phillip St. J. Russell, Journal of Optical Society of America B, Vol. 19, No. 9. pp. 2148-2155 (2002) (first document).

FIG. 1 of the accompanying drawings shows a cross-sectional SEM (Scanning Electron Microscope) photographic representation of a typical holey fiber. As shown in FIG. 1, the holey fiber has a central core having a diameter of about 2 μm, and includes many holes in a cladding around the core. The core is made of silica ($SiO_2$) and has a refractive index of about 1.5. The cladding is also made of $SiO_2$ and has a refractive index of about. 1.0 because of the holes formed therein. The difference between the refractive indexes of the core and the cladding is about 0.5. In the holey fiber, because light pulses are confined in and propagated through the small core having the diameter of about 2 μm, the light pulses strongly interact with the silica that the core is made of, developing a large nonlinear optical effect. Supercontinuum light is generated based on such a large nonlinear optical effect. By designing the holey fiber such that dispersion of light is essentially reduced to zero at the wavelength of the light pulses, the light pulses are prevented from being spread while being propagated through the optical fiber, making it possible to generate supercontinuum light efficiently.

The conventional process of generating supercontinuum light with an optical fiber such as a holey fiber requires the optical fiber to have a length of at least several centimeters in order to provide a sufficient interaction length. Since the generation of supercontinuum light needs light pulses having a peak power in kW to MW ranges and a pulse duration of several hundred fs, a large-size solid-state laser such as a titanium-sapphire laser has to be used as a pulse light source. Optical fibers such as holey fibers have no or very little dependency of propagation characteristics on propagated light having perpendicular planes of polarization. Therefore, if the optical fiber is bent or twisted, the planes of polarization are rotated while the light is being propagated through the optical fiber. If the optical fiber is long, such a phenomenon manifests itself, posing a problem on the stability for generating supercontinuum light.

As described above, the conventional process of generating supercontinuum light with an optical fiber such as a holey fiber is problematic in that a pulse light source and a wavelength-variable pulse light source comprising a holey fiber are large in size, and the generated supercontinuum light lacks stability. Furthermore, large-size solid-state lasers are highly expensive, and holey fibers are also highly expensive at present (several ten thousands yen per meter).

It has been studied to ascertain whether other nonlinear optical devices than highly nonlinear optical fibers and holey fibers may be used to generate supercontinuum light or not. One candidate for such other nonlinear optical devices is a thin-wire optical waveguide.

FIG. 2 of the accompanying drawings shows an example of a thin-wire optical waveguide. As shown in FIG. 2, the thin optical waveguide has substrate 20 such as of a semiconductor, lower cladding 21 of silica ($SiO_2$) disposed on substrate 20, and core 22 in the form of a thin silicon (Si) wire disposed on lower cladding 21. Core 22 has entrance end facet 220 and exit end facet 221 on its respective opposite ends. Prototype thin-wire optical waveguides having cores 22 whose heights range from 0.2 to 0.25 μm and whose widths range from 1.0 to 0.5 μm have already been fabricated. Since core 22 is made of Si, the refractive index thereof is about 3.5. Lower cladding 21 is made of $SiO_2$ and has a refractive index of about 1.5. An upper cladding is provided by air and has a refractive index of 1. Therefore, the difference between the refractive indexes of the core and the claddings is at least about 2. The thin-wire optical waveguide thus has a large refractive index difference between the core and the claddings.

FIG. 3 of the accompanying drawings shows an example of another thin-wire optical waveguide (see Japanese laid-open patent publication No. 2003-322737). As shown in FIG. 3, the thin-wire optical waveguide has substrate 30 such as of a semiconductor, lower cladding 31 of $SiO_2$ disposed on substrate 30, and core 32 in the form of a thin Si wire disposed on lower cladding 31. Unlike the thin-wire optical waveguide shown in FIG. 2, the above assembly is embedded in upper cladding 33 made of a polymer or $SiO_2$. Core 32 has entrance end facet 320 and exit end facet 321 on its respective opposite ends. Core 32 has a cross-sectional size represented by a height in the range from about 0.2 to 0.3 μm and a width in the range from about 0.27 to 0.33 μm. Since core 32 is made of Si, the refractive index thereof is about 3.5. Lower cladding 31 and upper cladding 33 are made of $SiO_2$ or a polymer and have a refractive index of about 1.5. Therefore, the difference between the refractive indexes of the core and the claddings is at least about 2. The thin-wire optical waveguide shown in FIG. 3 thus has a large refractive index difference between the core and the claddings.

Since the core of each of the thin-wire optical waveguides shown in FIGS. 2 and 3 is constructed as a thin wire, a large coupling loss is caused when light is introduced into the thin-wire optical waveguide. For increasing the efficiency with which to introduce light into the thin-wire optical waveguide, a process of forming a beam spot size converter by covering a tip end of the thin-wire optical waveguide with a polymer optical waveguide is disclosed in T. Shoji, T. Tsuchizawa, T. Watanabe, K. Yamada, and H. Morita, Electronics Letter, Vol. 38, No. 25. pp. 1669-1670 (2002) (second document).

The thin-wire optical waveguides described above is capable of realizing stronger light confinement than holey fibers. However, thin-wire optical waveguides have not widely been used as a nonlinear optical device. It has not been proposed to design the structure of a thin-wire optical waveguide which is suitable for generating white light pulses in order to achieve a light confining structure which is efficient to guide light pulses through a thin-wire optical waveguide and generate white light pulses, to design the structure of a thin-wire optical waveguide for controlling the dispersion of light, and to design the structure of a thin-wire optical waveguide for controlling planes of polarization for stabilizing white light pulses.

As described above, a thin-wire optical waveguide causes a large coupling loss when light is introduced into the thin-wire optical waveguide because the core is thin. It has not been studied to find a way to solve this problem in the generation of white light pulses.

Another nonlinear optical device which can possibly be used to generate supercontinuum light is a photonic crystal optical waveguide as shown in FIG. 4 of the accompanying drawings. However, it has not been proposed to design the structure of a photonic crystal optical waveguide for efficiently generating white light pulses and to design the structure of a photonic crystal optical waveguide for controlling the dispersion of light.

SUMMARY OF THE INVENTION

It is an object of the present invention to provide a compact nonlinear optical device (a thin-wire optical waveguide or a photonic crystal optical waveguide) which will eliminate the drawbacks of the conventional highly nonlinear optical fibers or holey fibers, and which is capable of generating white light pulses highly efficiently and stably.

Another object of the present invention is to provide a highly efficient, stable, and compact white light pulse light source or wavelength-variable pulse light source by combining such a nonlinear optical device, a small-size pulse light source such as a mode-locked semiconductor laser, and a tunable optical filter with each other.

To achieve the above objects, there is provided in accordance with the present invention a method of generating a white light pulse, comprising the steps of introducing a light pulse having a peak power of at least several hundreds W and a pulse duration of at most 10 ps into an entrance end facet of an optical waveguide including a core having a cross-sectional area of at most 1 µm² and a cladding, the core and the cladding having a refractive index difference of at least 1, and extracting the light pulse propagated through the optical waveguide as a white light pulse from an exit end facet thereof.

According to the present invention, there is also provided a method of converting the wavelength of a light pulse, comprising the steps of applying a white light pulse generated by the method as described above to a wavelength-variable optical filtering means which is set to pass light having a predetermined wavelength, and extracting a light pulse having the predetermined wavelength from the wavelength-variable optical filtering means.

According to the present invention, there is also provided a nonlinear-optic waveguide device, i.e., a thin-wire optical waveguide, comprising an entrance end facet for introducing a light pulse thereinto, a thin-wire core having a cross-sectional area of at most 1 µm² in at least a central device region, a cladding, the core and the cladding having a refractive index difference of at least 1, and an exit end facet for emitting the light pulse propagated through the core.

In the nonlinear-optic waveguide device, the core is preferably made of silicon which has a high refractive index and which is transparent in an optical communication wavelength band. The cladding is preferably made of silica or a polymer. Alternatively, the cladding is preferably made of at least two materials including silica and a polymer.

If the cladding is partly removed with the core having a portion exposed to air, then air serves as part of the cladding, and the core and the cladding have a large refractive index difference which is preferable to confine the light pulse in the core.

For increasing the efficiency with which the light pulse is applied to the core, the core preferably has a cross-sectional area progressively greater from the central device region toward the entrance end facet and/or the exit end facet. Conversely, the core may have a cross-sectional area progressively smaller from the central device region toward the entrance end facet and/or the exit end facet.

Since the thin-wire optical waveguide according to the present invention has a device length considerably smaller than holey fibers, dispersion in the optical waveguide is suppressed. For further suppressing dispersion, the core preferably has a slit for suppressing dispersion in the nonlinear-optic waveguide device. The slit preferably has a size, including a width and a depth, set such that the spreading of the light pulse on a time axis due to the dispersion in the nonlinear-optic waveguide device is reduced to at most 1/5 of a pulse duration of the light pulse.

The core may have a diffraction grating for suppressing dispersion in the nonlinear-optic waveguide device. The diffraction grating preferably has a size, including a periodic interval, set such that the spreading of the light pulse on a time axis due to the dispersion in the nonlinear-optic waveguide device is reduced to at most 1/5 of a pulse duration of the light pulse.

For maintaining planes of polarization of the light pulse propagated through the optical waveguide to stably generate supercontinuum light, the core preferably has an anisotropic shape. The core preferably has a ratio of vertical and horizontal dimensions, the ratio being at least 1.2.

According to the present invention, there is further provided a nonlinear-optic waveguide device, i.e., a photonic crystal optical waveguide, comprising an entrance end facet for introducing a light pulse thereinto, a two-dimensional photonic crystal slab having a linear defect disposed as a core therein, a cladding including a crystal lattice disposed in sandwiching relation to the linear defect of the two-dimensional photonic crystal slab, and an exit end facet for emitting the light pulse propagated through the core, wherein the product of the thickness and the lattice constant of the two-dimensional photonic crystal slab is at most 1 µm², and the core and the cladding have a refractive index difference of at least 1.

Preferably, the two-dimensional photonic crystal slab is made of silicon.

The two-dimensional photonic crystal slab preferably has a structure, including the lattice constant, set such that dispersion in the nonlinear-optic waveguide device is reduced to at most 1/5 of a pulse duration of the light pulse.

Preferably, the two-dimensional photonic crystal slab has a structure, including the lattice constant, set such that the group velocity of the light pulse propagated through the nonlinear-optic waveguide device is at most 1/10 of the velocity of light in vacuum.

The thickness and the lattice constant of the two-dimensional photonic crystal slab preferably have different values.

A white pulse light source according to the present invention has a nonlinear optical device described above, and a pulse light source for generating a light pulse to be introduced into the entrance end facet of the nonlinear optical device, the light pulse having a peak power of at least several hundreds W and a pulse duration of at most 10 ps. The pulse light source preferably comprises a mode-locked semiconductor laser.

A wavelength-variable pulse light source according to the present invention has a white pulse light source described above, and wavelength-variable light filtering means for extracting a predetermined wavelength component from a white light pulse generated by the white pulse light source.

The thin-wire optical waveguide or the photonic crystal optical waveguide according to the present invention has a nonlinear optical effect made easily greater than holey fibers which include a core having a cross-sectional area of about 3 $\mu m^2$ and a cladding, the core and the cladding having a refractive index difference of about 0.5. The thin-wire optical waveguide according to the present invention has a waveguide length of about 1 cm and the photonic crystal waveguide according to the present invention has a waveguide length of about several mm. The light pulse applied to the optical waveguides may have a lower peak power and a longer pulse duration than the holey fibers. If the light pulse has a peak power of at least several hundreds W and a pulse duration of at most 10 ps, then it can be generated by a compact mode-locked semiconductor laser. Using the thin-wire optical waveguide or the photonic crystal optical waveguide according to the present invention, the white pulse light source and the wavelength-variable pulse light source can be made compact.

According to the present invention, as described above, since the wavelength-variable pulse light source can be highly efficient, stable, and compact, the wavelength-variable pulse light source can be used as a device in a next-generation photonic network. The white pulse light source and the wavelength-variable pulse light source according to the present invention are not only applicable to communication networks, but also can find wide use as light sources in medical and analytic applications.

The above and other objects, features, and advantages of the present invention will become apparent from the following description with reference to the accompanying drawings which illustrate examples of the present invention.

DESCRIPTION OF THE PREFERRED EMBODIMENTS

Figure 5:
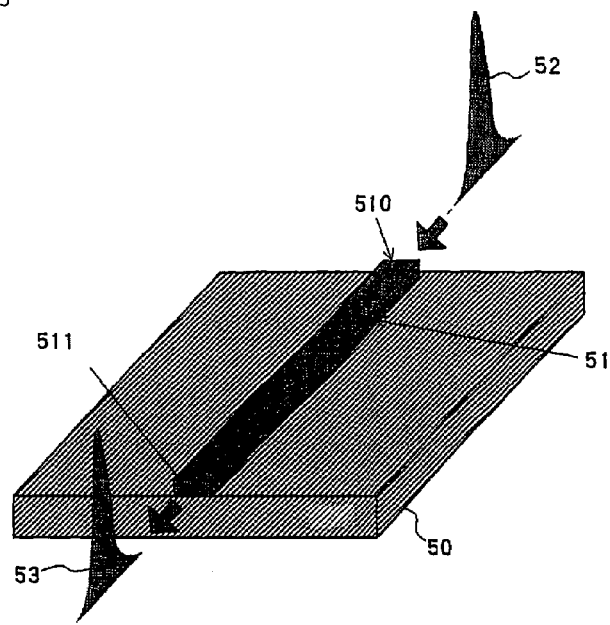
FIG. 5 is a perspective view illustrative of a process of generating white light pulses with a thin-wire optical waveguide according to the present invention.

FIG. 5 is illustrative of a process of generating white light pulses with a thin-wire optical waveguide according to the present invention. As shown in FIG. 5, the thin-wire optical waveguide has substrate 50 and core 51 disposed on substrate 50. Core 51 is in the form of a thin wire made of a material having a high refractive index. Core 51 has entrance end facet 510 and exit end facet 511 on its respective opposite ends. When light pulse 52 is introduced into core 51 from entrance end facet 510 thereof, light pulse 52 as it is propagated through core 51 interacts strongly with the material of the thin-wire optical waveguide, causing a nonlinear optical effect to output supercontinuum light 53 from exit end facet 511.

Figure 1:
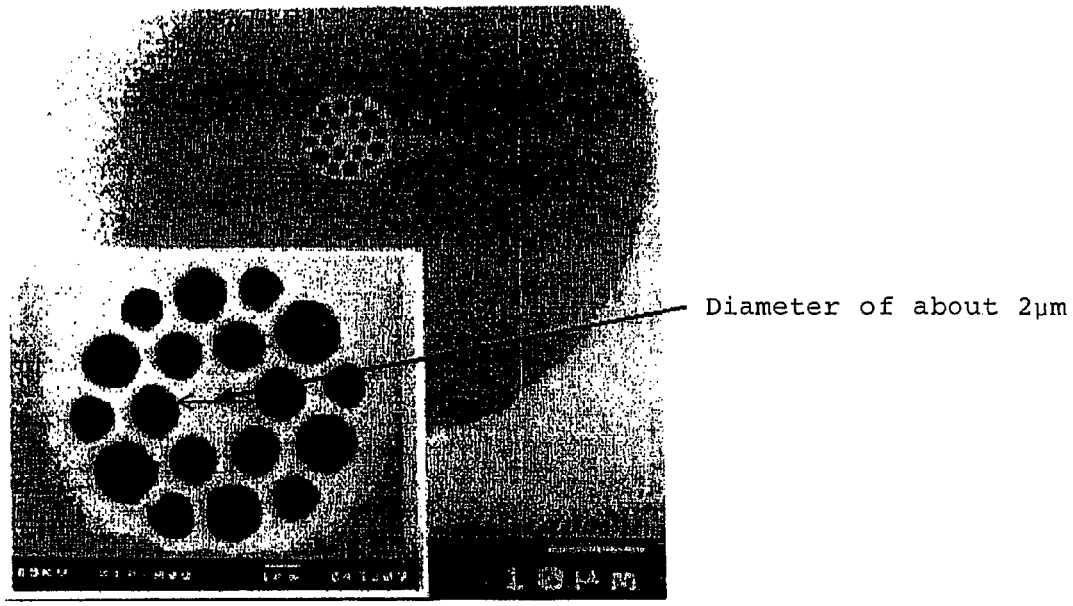
FIG. 1 is a cross-sectional SEM photographic representation of a typical holey fiber.
Figure 2:
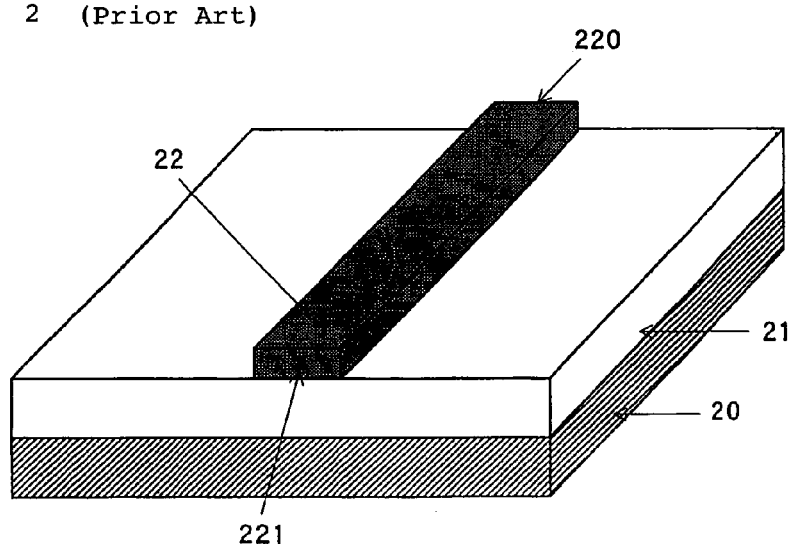
FIG. 2 is a perspective view showing an example of a thin-wire optical waveguide which is free of an upper cladding layer.
Figure 3:
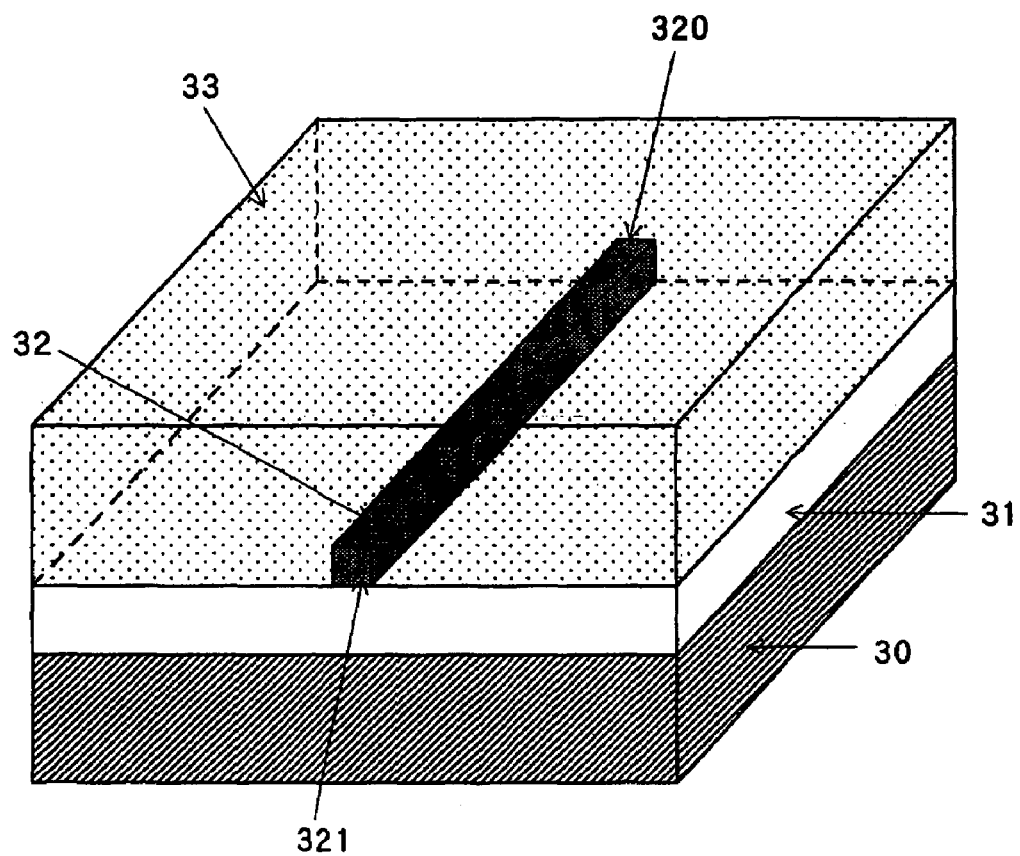
FIG. 3 is a perspective view showing another example of a thin-wire optical waveguide which has an upper cladding layer.

The thin-wire optical waveguides shown in FIGS. 2 and 3 function as the thin-wire optical waveguide according to the present invention by selecting a suitable size and materials for achieving a nonlinear optical effect. Thin-wire optical waveguides according to first and second embodiments of the present invention will be described as incorporating the thin-wire optical waveguides shown in FIGS. 2 and 3.

First, the thin-wire optical-waveguide shown in FIG. 2 as it functions as the thin-wire optical waveguide according to the first embodiment of the present invention will be described below. Specific details of the thin-wire optical waveguide according to the first embodiment of the present invention will be described below with reference to FIG. 2.

Lower cladding 21 made of a material having a refractive index of about 1.5 ($SiO_2$, polymethyl methacrylate (PMMA), polyimide, polymer, resin, or the like) is formed on substrate 20 having a relatively small refractive index, and core 22 having a refractive index of at least 2.5 is formed on lower cladding 21. Entrance end facet 220 and exit end facet 221 are formed respectively on the opposite ends of core 22. Core 22 is required to have a cross-sectional area of 1 $\mu m^2$ or less. The cross-sectional area of core 22 should preferably be 0.3 $\mu m^2$ or less or more preferably be 0.1 $\mu m^2$ or less. If the cross-sectional area of core 22 is 1 $\mu m^2$ or less, then it develops a nonlinear optical effect for generating supercontinuum light. If the cross-sectional area of core 22 is 0.3 $\mu m^2$ or less, then the nonlinear optical effect manifests itself. If the cross-sectional area of core 22 is 0.1 μm² or less, then core 22 can efficiently generate supercontinuum light.

Core 22 should preferably be made of Si having a refractive index of 3.5. In this case, the refractive index difference between core 22 and lower cladding 21 is about 2, and the refractive index difference between core 22 and air as an upper cladding which has a refractive index of 1 is about 2.5. For the generation of supercontinuum light, the refractive index difference between the core and the claddings needs to be at least 1. Core 22 may be made of a semiconductor material such as AlxGa1-xAs, InxGa1-xAsyP1-y, InxGa1-xN, or GaxInyN1-x-yAs rather than Si. These semiconductor materials have as high a high refractive index as Si, and are transparent in an optical communication wavelength band of 1.55 μm.

Substrate 20 may be made of any materials insofar as they satisfy predetermined mechanical, optical, and thermal characteristics. For example, substrate 20 may be made of an insulating material such as glass, plastic, quartz, sapphire, or the like, or a semiconductor material such as Si, GaAsInP, or the like. Particularly, it is preferable to machine an SOI (Silicon On Insulator) substrate into substrate 20 for the ease of fabrication.

The thin-wire optical waveguide shown in FIG. 3 as it functions as the thin-wire optical waveguide according to the second embodiment of the present invention will be described below. Specific details of the thin-wire optical waveguide according to the second embodiment of the present invention will be described below with reference to FIG. 3.

Lower cladding 31 is formed on substrate 30, core 32 is formed on lower cladding 31, and upper cladding 33 made of a material having a refractive index of about 1.5 (SiO₂, PMMA, polyimide, polymer, resin, or the like) is formed on core 32. Entrance end facet 320 and exit end facet 321 are formed respectively on the opposite ends of core 32.

Claddings 31, 33 may be made of different materials. For example, lower cladding 31 may be made of SiO₂, and upper cladding 33 may be made of a polymer. Lower cladding 31 made of SiO₂ can stably hold core 32 thereon. If core 32 is covered with a soft polymer, then strains produced in the thin-wire optical waveguide can be absorbed, making the thin-wire optical waveguide structurally stable.

The thin-wire optical waveguide according to the first embodiment has air as the upper cladding. The thin-wire optical waveguide according to the second embodiment has the upper cladding made of a material having a refractive index of about 1.5. Therefore, the refractive index difference between the core and the claddings according to the second embodiment is smaller. However, the core is protected by the upper cladding. Other details of the thin-wire optical waveguide according to the second embodiment are the same as the thin-wire optical waveguide according to the first embodiment.

With the thin-wire optical waveguides according to the present invention, light is confined in the core having a very high refractive index and interacts strongly with the material of the thin-wire optical waveguide to develop a large non-linear optical effect. Thin-wire optical waveguides according to third and fourth embodiments of the present invention, which have structures capable of confining more strongly than the structures incorporating the thin-wire optical waveguides shown in FIGS. 2 and 3 will be described below.

Figure 6:
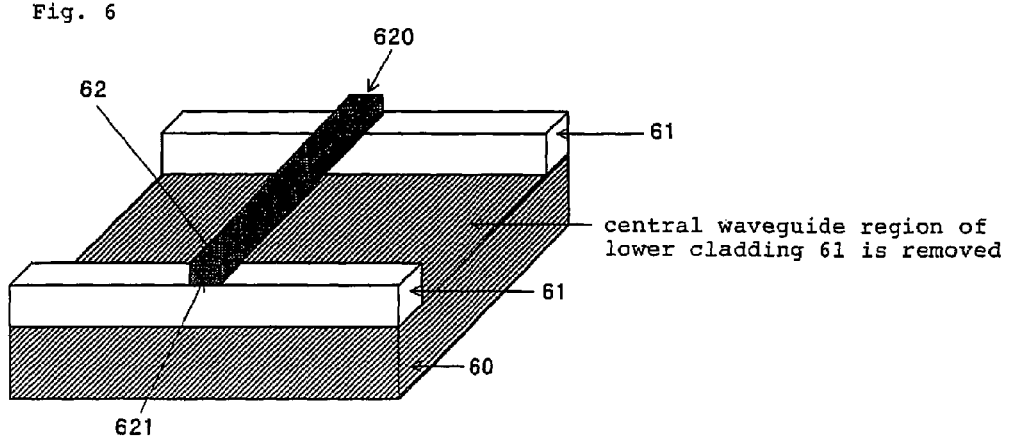
FIG. 6 is a perspective view of an example of a thin-wire optical waveguide which is free of an upper cladding layer and has a lower cladding layer whose central waveguide region is removed.

FIG. 6 shows in perspective a thin-wire optical waveguide according to a third embodiment of the present invention. The thin-wire optical waveguide in FIG. 6 differs from the thin-wire optical waveguide according to the first embodiment, which incorporates the structure shown in FIG. 2, in that a central waveguide region of lower cladding 21, 61 on substrate 20, 60 is removed to provide air in the central waveguide region of lower cladding 21, 61. Therefore, a larger refractive index difference is achieved between core 62 and the cladding for providing a stronger light confining capability. Other details of the thin-wire optical waveguide according to the third embodiment are the same as the thin-wire optical waveguide according to the first embodiment.

Figure 7:
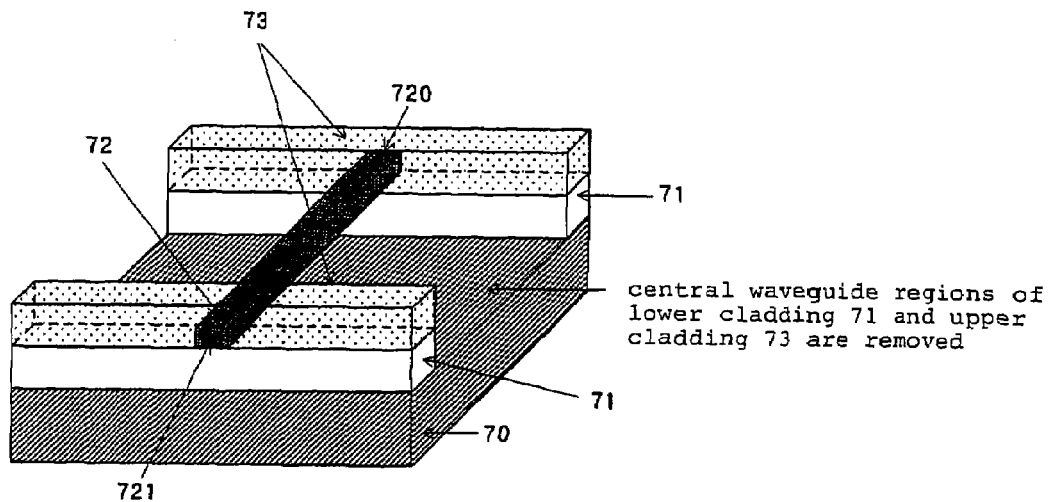
FIG. 7 is a perspective view of an example of a thin-wire optical waveguide which has upper and lower cladding layers whose central waveguide regions are removed.

FIG. 7 shows in perspective a thin-wire optical waveguide according to a fourth embodiment of the present invention. The thin-wire optical waveguide shown in FIG. 7 differs from the thin-wire optical waveguide according to the second embodiment, which incorporates the structure shown in FIG. 3, in that central waveguide regions of lower cladding 31, 71 and upper cladding 33, 73 are removed to provide air in these central waveguide regions of lower cladding 31, 71 and upper cladding 33, 73. Therefore, a larger refractive index difference is achieved between core 72 and the claddings for providing a stronger light confining capability. Other details of the thin-wire optical waveguide according to the fourth embodiment are the same as the thin-wire optical waveguide according to the second embodiment.

The efficiency with which to introduce light into the core may be improved by increasing the cross-sectional area of the core near the entrance end facet thereof. Specifically, the cross-sectional area of the core in the central waveguide region is kept as the above size, and the cross-sectional area of the core at the entrance end facet thereof is increased. In this manner, the cross-sectional area of the core is continuously increased from the size in the central waveguide region to the size at the entrance end facet in the direction from near the entrance end facet toward the entrance end facet, thus improving the efficiency with which to introduce light into the core. Since the cross-sectional size of the core which is required to generate supercontinuum light is smaller than the entrance end facet of other optical components, the exist end facet of the core may similarly be dimensioned to alloy easy connection of the thin-wire optical waveguide to another optical component. Thin-wire optical waveguides shown in FIGS. 8A and 8B have the improved efficiency with which to introduce light into the core based on the above approach.

Figure 8A:
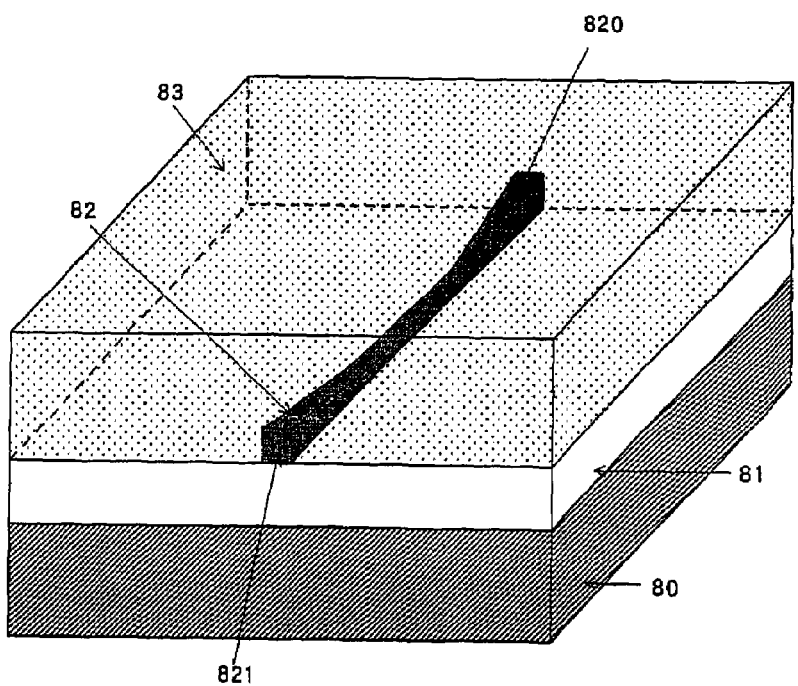
FIG. 8A is a perspective view of an example of a thin-wire optical waveguide which has a core having larger cross-sectional areas at respective entrance and exit end facets thereof.

FIG. 8A shows in perspective a thin-wire optical waveguide according to a fifth embodiment of the present invention. The thin-wire optical waveguide shown in FIG. 8A is similar to the thin-wire optical waveguide according to the second embodiment shown in FIG. 3 except that the cross-sectional size of core 82 is larger near entrance end facet 820 and exit end facet 821. The cross-sectional area of the core in the central waveguide region is required to be 1 μm² or less, preferably 0.3 μm² or less, or more preferably 0.1 μm² or less. The cross-sectional area of entrance end facet 820 is not limited to any values insofar as it is the same as or greater than the diameter of the applied light beam.

However, if the cross-sectional area of entrance end facet 820 is too large, then the applied light beam may be propagated in multiple modes, tending to impair the stability of the generation of white light pulses. In addition, if the portion of core 82 ranging from the cross-sectional area of the entrance end facet 820 to the cross-sectional area of the central waveguide region (hereinafter referred to as "entrance portion") is too short, then the applied light beam cannot be converged into the central waveguide region, causing a coupling loss. Therefore, the entrance portion needs to be of such a length as not to cause a coupling loss, specifically of a length which is at least about ten times the length of a side (or the diameter) of entrance end facet 820.

Consequently, if the cross-sectional area of entrance end facet 820 is too large, then since the entrance portion has to be elongated, the thin-wire optical waveguide has to be long as a whole. For this reason, the cross-sectional area of entrance end facet 820 should preferably be about the same as or twice the diameter of the applied light beam. Exit end facet 821 may also be dimensioned in the same manner as entrance end facet 820. Specifically, when the diameter of the applied light beam is about 0.4 µm, then core 82 should have a height of about 0.3 µm and a width of about 0.3 µm at both entrance end facet 820 and exit end facet 821, and a height of about 0.3 µm and a width of about 0.2 µm in the central waveguide region.

The efficiency with which to introduce light into the core may also be improved by reducing the cross-sectional area of the core near the entrance end facet thereof. If the cross-sectional area of the core is reduced to a value smaller than a certain cross-sectional area, then light is no longer confined within the thin core, but tends to go out of the core, so that the diameter of the guided light beam becomes large. If the core is appropriately designed into a tapered shape, then its size may be equalized to the diameter of the applied light beam. Specifically, the thin core which has a thickness of about 0.25 µm and a width of about 0.3 µm in the central waveguide region may be progressively tapered over a length of about 100 µm into tip ends having a thickness of about 0.2 µm and a width of about 0.1 µm. The tip ends of the tapered core may not necessarily reach the end facets of the thin-wire optical waveguide for the thin-wire optical waveguide to function properly. Other details of the thin-wire optical waveguide according to the fifth embodiment are the same as the thin-wire optical waveguide according to the second embodiment.

Figure 8B:
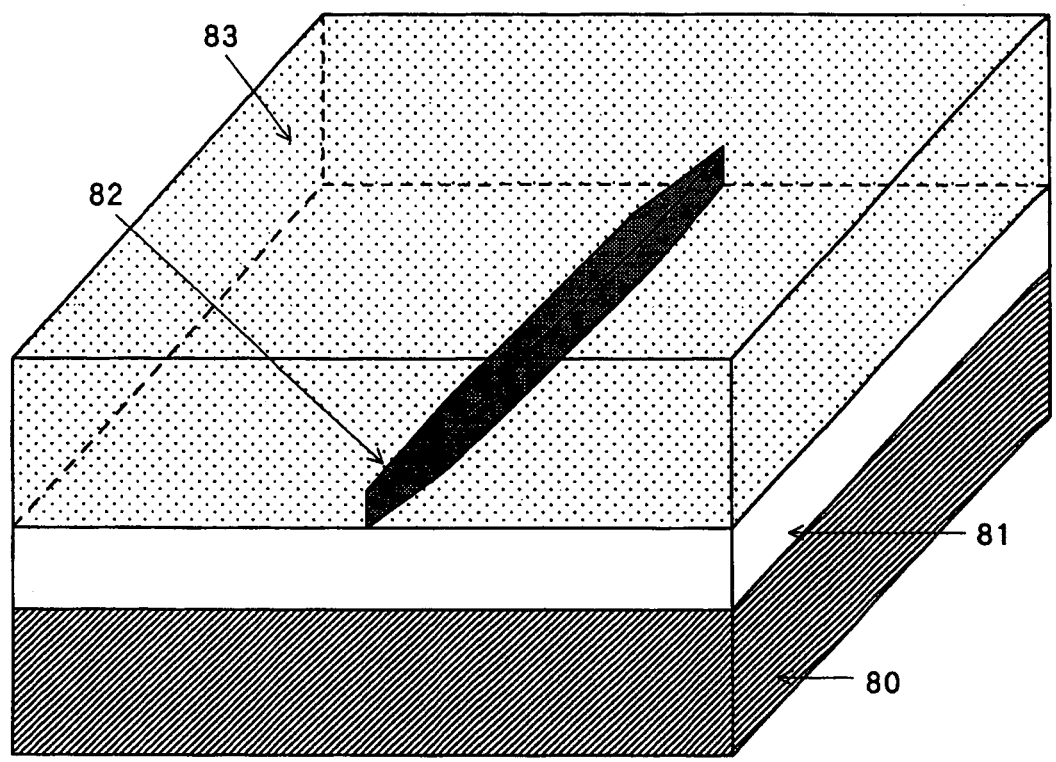
FIG. 8B is a perspective view of an example of a thin-wire optical waveguide which has a core having smaller cross-sectional areas at respective entrance and exit end facets thereof.

The thin-wire optical waveguide according to the fifth embodiment shown in FIGS. 8A and 8B has been described above based on the thin-wire optical waveguide according to the second embodiment shown in FIG. 3. However, the thin-wire optical waveguide according to the fifth embodiment may be constructed on the basis of the thin-wire optical waveguide according to the first embodiment shown in FIG. 2, the third embodiment shown in FIG. 6, or the fourth embodiment shown in FIG. 7.

The efficiency with which to introduce light into the core may further be improved by forming the beam spot side converter disclosed in the second document referred to above. Alternatively, any of various light converging systems using lenses and concave mirrors may be used to improve the efficiency with which to introduce light into the core.

Figure 9:
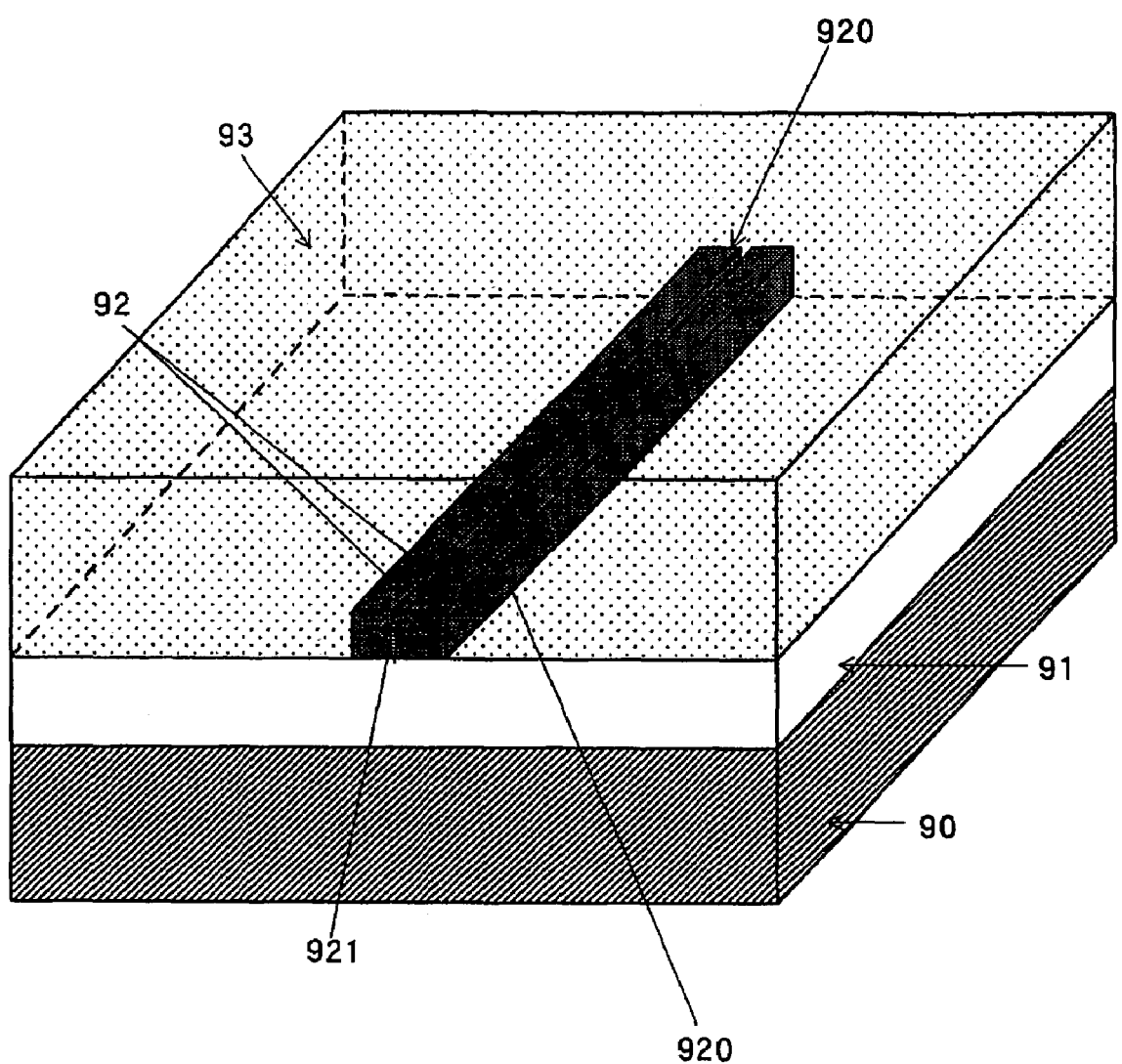
FIG. 9 is a perspective view of an example of a thin-wire optical waveguide which has a core having a slit defined therein for suppressing dispersion of light.
Figure 10:
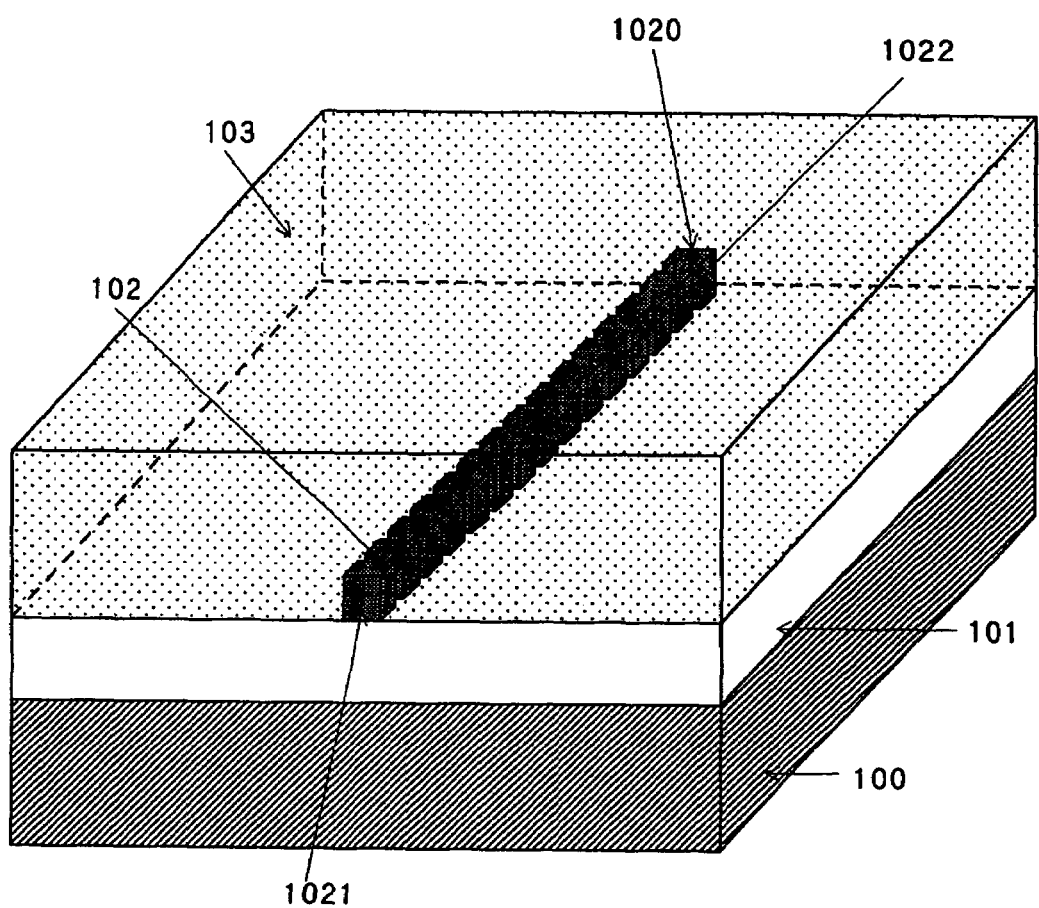
FIG. 10 is a perspective view of an example of a thin-wire optical waveguide which has a core having a diffraction grating for suppressing dispersion of light.

The thin-wire optical waveguides according to the present invention are also advantageous in that they can suppress dispersion of light as the length of the thin-wire optical waveguides can be much smaller than holey fibers. For better nonlinear optical characteristics, the spreading of light pulses due to the dispersion should preferably be reduced to ⅕ or less of the duration of the light pulses. If possible, the spreading of light pulses due to the dispersion should preferably be reduced to ⅒ or less of the duration of the light pulses. The spreading of light pulses due to the dispersion can be reduced to ⅒ or less of the duration of the light pulses by incorporating a dispersion suppressing mechanism in the thin-wire optical waveguide. FIGS. 9 and 10 show thin-wire optical waveguides incorporating dispersion suppressing mechanisms.

FIG. 9 shows in perspective a thin-wire optical waveguide according to a sixth embodiment of the present invention. The thin-wire optical waveguide according to the sixth embodiment is similar to the thin-wire optical waveguide according to the second embodiment shown in FIG. 3 except that core 92 has slit 920 defined longitudinally therein for reducing the refractive index dispersion in the thin-wire optical waveguide. Slit 920 functions as a dispersion suppressing mechanism. Slit 920 has a width which is ¹⁄₂₀ to ⅓, preferably ⅒ to ⅕, of the transverse width of core 92 along its transverse cross section. Slit 920 may be interrupted in the longitudinal direction, or may be provided as a plurality of slits along the longitudinal direction. If slit 920 is formed nearly centrally in the transverse cross section of core 92 and extends in the full longitudinal direction of core 92, then it provides good nonlinear optical characteristics. However, even if slit 92 is extends partly in the longitudinal direction of core 92, it provides a dispersion suppressing capability. According to a specific example, if slit 920 is formed nearly centrally in the transverse cross section of core 92 and extends in the full longitudinal direction of core 92, then when core 92 has a thickness of about 0.3 µm and a width of about 3.0 µm, slit 920 has a width of 0.05 µm and a depth of about 0.1 µm centrally in the transverse cross section of core 92. A simulation indicates that slit 920 thus formed is effective to reduce the dispersion to substantially zero in a wavelength band of 1.55 µm. Other details of the thin-wire optical waveguide according to the sixth embodiment are the same as the thin-wire optical waveguide according to the second embodiment.

The thin-wire optical waveguide according to the sixth embodiment shown in FIG. 9 has been described above based on the thin-wire optical waveguide according to the second embodiment shown in FIG. 3. However, the thin-wire optical waveguide according to the sixth embodiment may be constructed on the basis of the thin-wire optical waveguide according to the first embodiment shown in FIG. 2, the third embodiment shown in FIG. 6, the fourth embodiment shown in FIG. 7, or the fifth embodiment shown in FIGS. 8A and 8B.

FIG. 10 shows in perspective a thin-wire optical waveguide according to a seventh embodiment of the present invention. The thin-wire optical waveguide according to the seventh embodiment is similar to the thin-wire optical waveguide according to the second embodiment shown in FIG. 3 except that diffraction grating 1022 is disposed in the longitudinal direction of the thin-wire optical waveguide. Diffraction grating 1022 is provided by periodic lands and grooves on upper and lower surfaces or side surfaces of core 102. The depth and periodic intervals of the grooves of diffraction grating 1022 may optimally be selected to achieve zero dispersion in a desired wavelength range. The optimum depth and periodic intervals of the grooves of diffraction grating 1022 may be calculated from the wavelength of the applied light beam, the refractive indexes of core 102 and claddings 101, 103, and the sizes thereof. Diffraction grating 1022 disposed on both side surfaces of core 102 in the full longitudinal direction of core 102 provides better nonlinear optical characteristics. According to a specific example, diffraction grating 1022 comprises lands and grooves disposed at periodic intervals of about 0.3 µm, with the lands projecting a distance of about 0.02 µm, on both side surfaces of core 102. It has been found based on calculations that this example provides zero dispersion. Other details of the thin-wire optical waveguide according to the seventh embodiment are the same as the thin-wire optical waveguide according to the second embodiment.

The thin-wire optical waveguide according to the seventh embodiment shown in FIG. 10 has been described above based on the thin-wire optical waveguide according to the second embodiment shown in FIG. 3. However, the thin-wire optical waveguide according to the seventh embodiment may be constructed on the basis of the thin-wire optical waveguide according to the first embodiment shown in FIG. 2, the third embodiment shown in FIG. 6, the fourth embodiment shown in FIG. 7, or the fifth embodiment shown in FIGS. 8A and 8B.

According to each of the above embodiments, the thin-wire optical waveguide is linearly disposed on the substrate. However, the thin-wire optical waveguide may not necessarily be linearly disposed on the substrate. Since the core of the thin-wire optical waveguide according to the present invention is made of a material having a high refractive index, light seepage from the core is small even if the thin-wire optical waveguide is bent. In particular, if the refractive index difference between the core and the claddings exceeds 2, then little light seepage occurs from the core even if the thin-wire optical waveguide is bent. A thin-wire optical waveguide shown in FIG. 11 provides a sufficient interaction length for interaction between light and the medium of the thin-wire optical waveguide in a limited substrate space.

Figure 11:
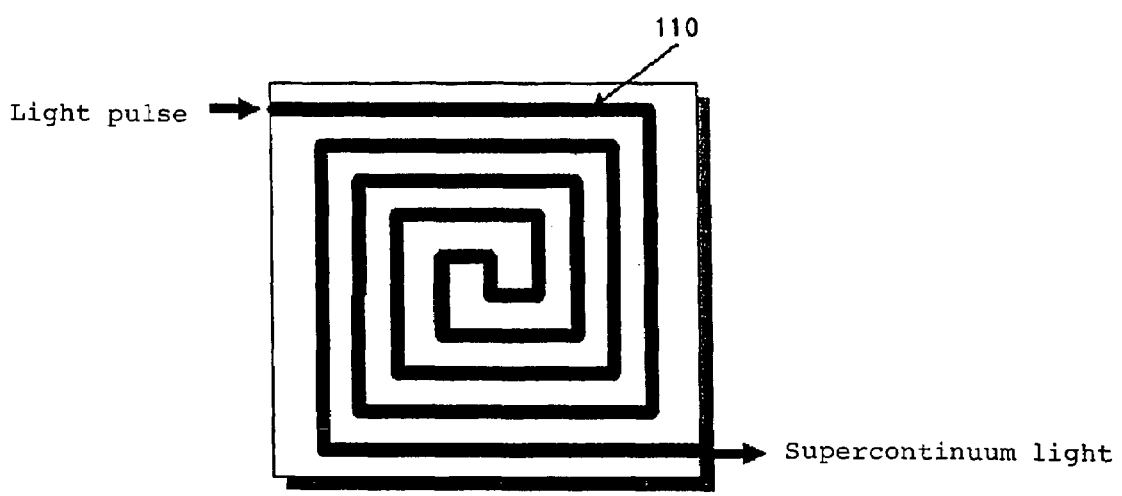
FIG. 11 is a plan view of an example of a thin-wire optical waveguide which has a folded core.

FIG. 11 shows in plan a thin-wire optical waveguide according to an eighth embodiment of the present invention. As shown in FIG. 11, the thin-wire optical waveguide is spirally shaped. Inasmuch as the efficiency with which supercontinuum light is generated is higher in proportion to the square of the peak power of applied light pulses and the length of the waveguide, the waveguide needs a certain length. The thin-wire optical waveguide according to the eighth embodiment provides a required waveguide length even if the device has a limited area. The spirally shaped thin-wire optical waveguide makes the area of the substrate more compact. The thin-wire optical waveguide according to the eighth embodiment may be constructed on the basis of each of the thin-wire optical waveguides according to the first through seventh embodiments.

The thin-wire optical waveguides according to the first through eighth embodiments have been described above. The features of the first embodiment (the structure free of an upper cladding layer as shown in FIG. 2), the second embodiment (the structure including an upper cladding layer as shown in FIG. 3), the third embodiment (the structure free of an upper cladding layer and including a centrally removed lower cladding layer as shown in FIG. 6), the fourth embodiment (the structure including centrally removed upper and lower cladding layers as shown in FIG. 7), the fifth embodiment (the structure including a core having an increased or decreased cross-sectional area at entrance and exit end facets as shown in FIG. 8A or 8B), the sixth embodiment (the structure including a slit defined in a core as a dispersion suppressing mechanism as shown in FIG. 9), the seventh embodiment (the structure including a diffraction grating disposed on a core as a dispersion suppressing mechanism as shown in FIG. 10), and the eighth embodiment (the structure including a folded core as shown in FIG. 11) may be combined as desired to provide new thin-wire optical waveguides according to other embodiments of the present invention.

A semiconductor material such as Si is transparent in a wavelength range of 1 μm or greater. However, since the semiconductor material is not transparent in the visible wavelength range, it cannot be used as a waveguide material for generating white light pulses in the visible wavelength range. If the core of the thin-wire optical waveguide according to the present invention is made of a material having a high refractive index of 2 or more, which is transparent in the visible wavelength range, then the thin-wire optical waveguide according to the present invention can be used in the visible wavelength range. For example, the core may be made of $TiO_2$ having a refractive index of 2.4, $Ta_2O_5$ having a refractive index of 2.1, zirconia having a refractive index of 2.2, diamond having a refractive index of 2.4, or the like. The claddings may be made of $SiO_2$ or a polymer material.

The core of the thin-wire optical waveguide according to the present invention should preferably be of an anisotropic cross-sectional shape having different lengths in two perpendicular directions, e.g., an elongate rectangular cross-sectional shape, a trapezoidal cross-sectional shape, or an elliptical cross-sectional shape, rather than an isotropic cross-sectional shape such as a circular cross-sectional shape or a regular polygonal shape. The core having an anisotropic cross-sectional shape makes it possible to stably maintain planes of polarization of propagated light. As a result, supercontinuum light can be generated stably. Specifically, the core may be shaped to develop a sufficiently large effective difference between refractive indexes with respect to propagated light having two perpendicular planes of polarization. It has been found as the result of simulations that the ratio of core widths should be 1:1.2 or more or more preferably 1:1.5 for better results.

If the core has a square cross-sectional shape and the cladding around the core has a uniform refractive index, then any difference between the propagation characteristics with respect to light having perpendicular planes of polarization is small. Therefore, even if the waveguide length is small, the planes of polarization may be rotated while light is being propagated through the thin-wire optical waveguide, a condition which is not preferable for the stability of the generation of supercontinuum light. However, if only the lower cladding beneath the core is made of $SiO_2$, for example, with air surrounding the rest of the core, as with the thin-wire optical waveguide according to the first embodiment shown in FIG. 2, the third embodiment shown in FIG. 6, or the fourth embodiment shown in FIG. 7, then the core is not independent of polarization even if it has an isotropic cross-sectional shape such as a square cross-sectional shape, the core can maintain the planes of polarization of propagated light. Stated otherwise, using air as part of the cladding is useful in not only increasing the refractive index difference between the core and the cladding, but also providing polarization dependency.

The generation of white light pulses with a photonic crystal optical waveguide according to the present invention will be described below. The photonic crystal optical waveguide shown in FIG. 4 can function as a photonic crystal optical waveguide according to the present invention by selecting predetermined sizes and materials. A photonic crystal optical waveguide according to the present will be described below with reference to FIG. 4.

Figure 4:
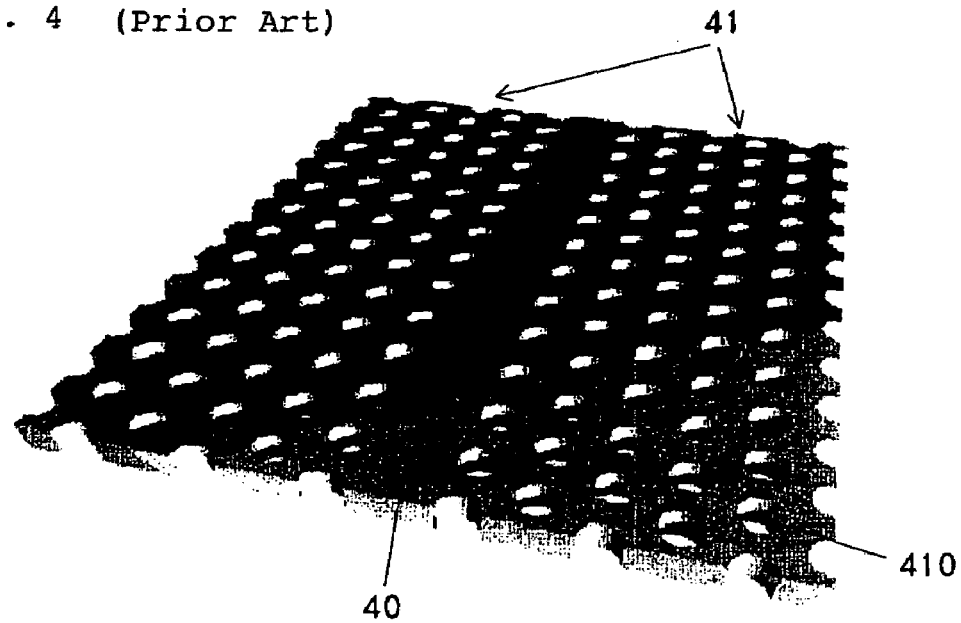
FIG. 4 is a perspective view showing an example of a photonic crystal optical waveguide.

As shown in FIG. 4, a two-dimensional photonic crystal has air holes 410 defined in a triangular grid-like pattern in a thin semiconductor panel made of Si or the like having a relatively large refractive index. Core 40 is formed in the two-dimensional photonic crystal by introducing a linear defect into the two-dimensional photonic crystal. Air holes 410 are disposed in regions on both sides of core 40, the regions serving as cladding 41. Light applied to the two-dimensional photonic crystal is confined within the plane of the thin semiconductor panel by the effect of a photonic band gap due to the photonic crystal, and is also confined across the thickness of the thin semiconductor panel by the refractive index difference, with the linear defect functioning as core 40.

The core 40 of the photonic crystal optical waveguide has a very small cross-sectional size of 0.25×0.4 μm because the thin semiconductor panel usually has a thickness of about 0.25 μm and the lattice constant of the photonic crystal is about 0.4 μm. The core of the photonic crystal optical waveguide needs to have a cross-sectional area of 1 μm$^2$ or less, and the refractive index difference between the core and the cladding thereof needs to be 1 or more. The same advantages as described above can be achieved even if the photonic crystal optical waveguide employs a thin panel of a compound semiconductor such as AlGaAs, InGaAsP, or the like. As with the thin-wire optical waveguide, the photonic crystal optical waveguide has a very strong light confining capability and polarization dependency. However, since the photonic crystal optical waveguide also has a large refractive index dispersion depending on the wavelength, the photonic crystal optical waveguide requires dispersion control for use as a nonlinear optical device for introducing light pulses thereinto.

Figure 12:
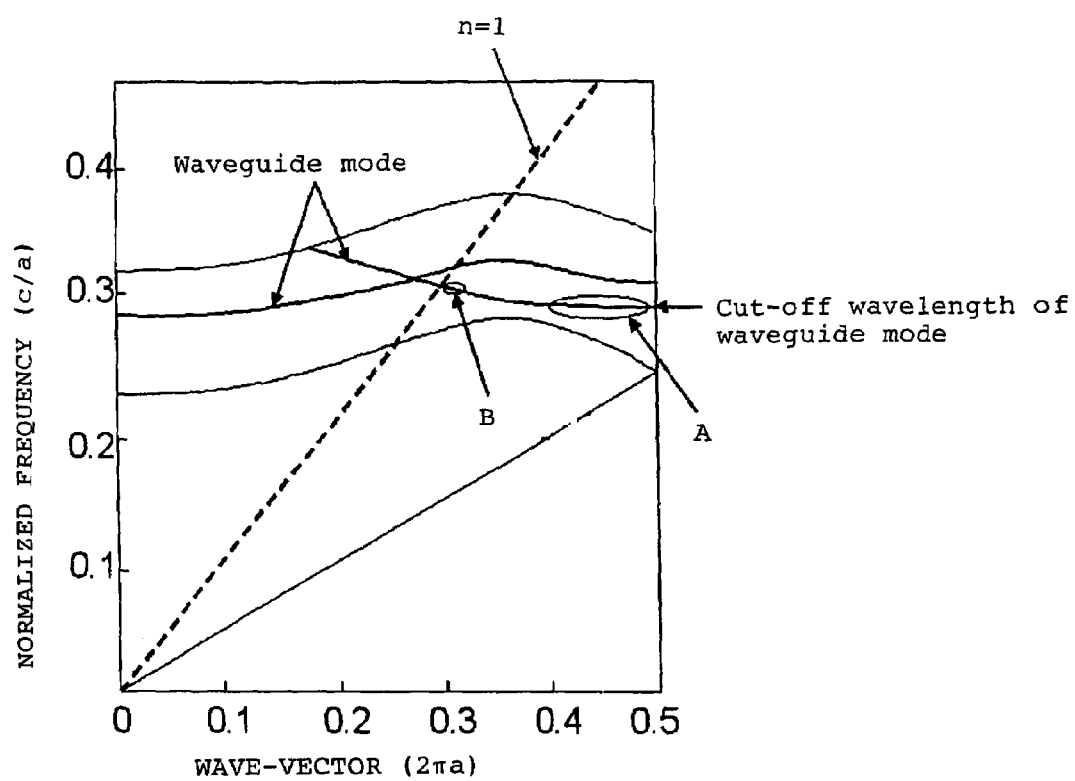
FIG. 12 is a diagram showing the relationship of waveguide mode dispersions in a photonic crystal optical waveguide.

As can be seen from the relationship of waveguide mode dispersions shown in FIG. 12, the photonic crystal optical waveguide has a very large dispersion in the vicinity of a cut-off wavelength of the waveguide mode (A in FIG. 12). As the wavelength of the waveguide mode changes from the cut-off wavelength toward shorter wavelengths, the dispersion goes smaller, and becomes nil at a certain frequency (B in FIG. 12). Subsequently, the dispersion has an opposite sign and tends to become larger. Therefore, a wavelength selection process should necessary lead to a wavelength where the dispersion in the waveguide cancels out the material dispersion. If the hole diameter and the periodic interval of the photonic crystal are optimized based on a cut-and-try approach, zero dispersion can be achieved at a desired wavelength. The spreading of light pulses due to the dispersion should preferably be reduced to ⅕ or less of the duration of the applied light pulses. If possible, the spreading of light pulses due to the dispersion should preferably be reduced to ⅒ or less of the duration of the applied light pulses.

The photonic crystal optical waveguide makes it possible to extremely lower the group velocity of light that is propagated through the waveguide. It is possible to lower the group velocity to a fraction of the velocity of light in vacuum. As a result, light and the material of the waveguide interact for a prolonged period of time, effectively providing a nonlinear optical effect. The group velocity of light propagated through the waveguide can be controlled by the hole diameter and the periodic interval of the photonic crystal, and should preferably be at most one tenth of the velocity of light in vacuum.

Figure 13:
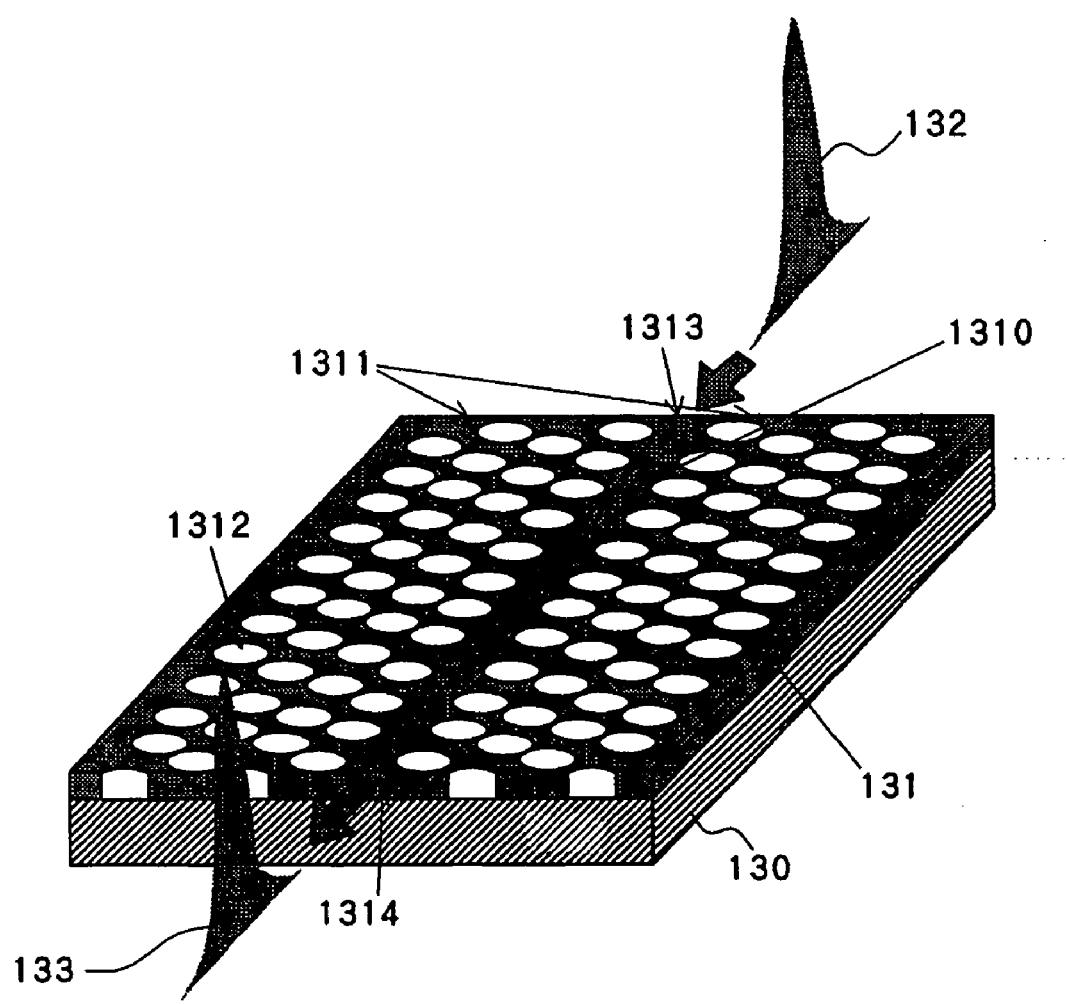
FIG. 13 is a perspective view illustrative of a process of generating white light pulses with a photonic crystal optical waveguide according to the present invention.

FIG. 13 is illustrative of a process of generating white light pulses with a photonic crystal optical waveguide according to the present invention. As shown in FIG. 13, the photonic crystal optical waveguide has photonic crystal slab 131 disposed on substrate 130 and having a plurality of air holes 1312 defined therein. Photonic crystal slag 131 has core 1310 formed centrally therein by introducing a linear defect thereinto. Air holes 1312 are disposed in regions on both sides of core 1310, the regions serving as cladding 1311. Core 1310 has entrance end facet 1313 and exit end facet 1314 on respective opposite ends thereof. As with the thin-wire optical waveguide, when light pulse 132 is introduced into core 1310, the photonic crystal optical waveguide generates supercontinuum light 133. A beam spot size converter may be used with the photonic crystal optical waveguide for increasing the efficiency with which an optical fiber and the photonic crystal optical waveguide are coupled.

Figure 14:
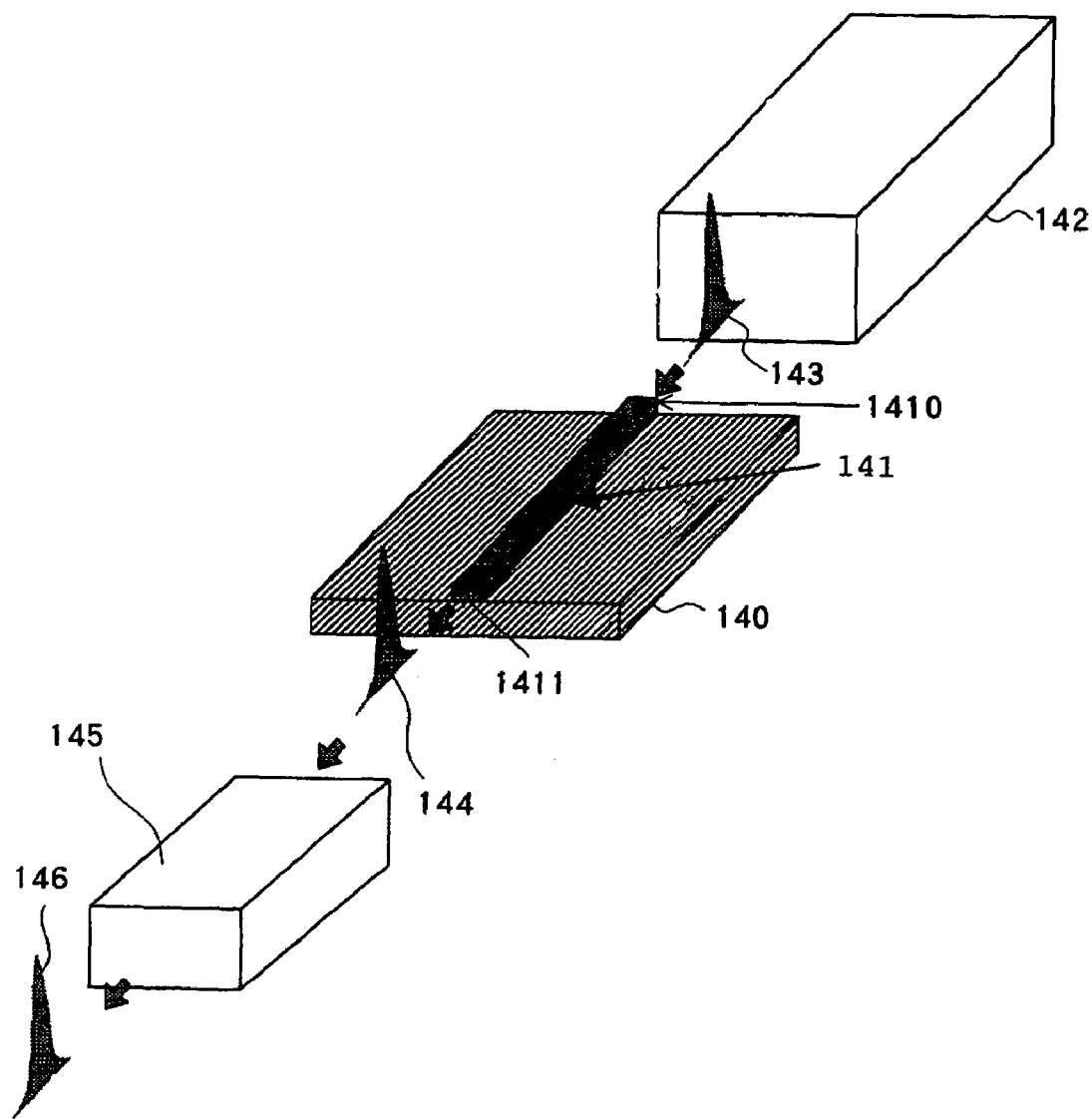
FIG. 14 is a perspective view illustrative of a process of converting the wavelength of light pulses according to the present invention.

FIG. 14 is illustrative of a process of converting the wavelength of light pulses according to the present invention. FIG. 14 shows a thin-wire optical waveguide including thin-wire core 141 disposed on substrate 140. However, the thin-wire optical waveguide may be replaced with a photonic crystal optical waveguide. The thin-wire optical waveguide is combined with mode-locked semiconductor laser 142 for generating light pulses and tunable optical filter 145, providing a compact wavelength-variable pulse light source. Light pulse 143 having a central wavelength $\lambda 1$, which is emitted from mode-locked semiconductor laser 142, is introduced into the thin-wire optical waveguide or the photonic crystal optical waveguide. While introduced light pulse 143 is being propagated through core 141, it is subjected to self-phase modulation, and emitted from exit end facet 1411 as a white light pulse with a spread spectrum, i.e., supercontinuum light 144. Supercontinuum light 144 emitted from exit end facet 1411 is converted into light pulse 146 having a central wavelength $\lambda 2$ by tunable optical filter 145 that is set to pass light having the central wavelength $\lambda 2$.

For the generation of white light pulses or the wavelength conversion of light pulses, the thin-wire optical waveguide needs a waveguide length of about 1 cm and the photonic crystal waveguide needs a waveguide length of about several mm, and the light pulses need to have a peak power of several hundreds W and a pulse duration of about 10 ps. Since the mode-locked semiconductor laser can easily generate light pulses having a peak power of several hundreds W and a pulse duration ranging from 2 to 3 ps, it can be used directly as an exciting pulse light source. If chirping of the light pulses is compensated for, then the pulse duration of the light pulses can be reduced to a pulse duration in subpicoseconds. If the pulse duration of the light pulses is reduced to a pulse duration in subpicoseconds, then the peak power is increased commensurately with the reduction of the pulse duration. Therefore, supercontinuum light can be generated highly efficiently. If the chirping compensating function is performed by the thin-wire optical waveguide or the photonic crystal optical waveguide, then the overall assembly is simple and preferable as no separate component is to be added for performing chirping compensation.

While preferred embodiments of the present invention have been described using specific terms, such description is for illustrative purposes only, and it is to be understood that changes and variations may be made without departing from the spirit or scope of the following claims.

The invention claimed is:

1. A method of generating a white light pulse, comprising the steps of:
    introducing a light pulse having a peak power of at least several hundreds W and a pulse duration of at most 10 ps into an entrance end facet of an optical waveguide including a core having a cross-sectional area of at most 1 μm$^2$ and a cladding, the core and the cladding having a refractive index difference of at least 1; and
    extracting said light pulse propagated through said optical waveguide as a white light pulse from an exit end facet thereof.

2. A method of converting the wavelength of a light pulse, comprising the steps of:
applying a white light pulse generated by the method according to claim 1 to a wavelength-variable optical filtering means which is set to pass light having a predetermined wavelength; and
extracting a light pulse having said predetermined wavelength from said wavelength-variable optical filtering means.

3. A nonlinear-optic waveguide device comprising:
an entrance end facet for introducing a light pulse thereinto;
a thin-wire core having an anisotropic shape and a cross-sectional area of at most 1 μm² in at least a central device region;
a cladding, said core and said cladding having a refractive index difference of at least 1; and
an exit end facet for emitting said light pulse propagated through said core.

4. A nonlinear-optic waveguide device according to claim 3, wherein said core is made of silicon.

5. A nonlinear-optic waveguide device according to claim 3, wherein said cladding is made of silica or a polymer.

6. A nonlinear-optic waveguide device according to claim 3, wherein said cladding is made of at least two materials including silica and a polymer.

7. A nonlinear-optic waveguide device according to claim 3, wherein said cladding is partly removed with said core having a portion exposed to air.

8. A nonlinear-optic waveguide device according to claim 3, wherein said core has a cross-sectional area progressively greater from said central device region toward said entrance end facet and/or said exit end facet.

9. A nonlinear-optic waveguide device according to claim 3, wherein said core has a cross-sectional area progressively smaller from said central device region toward said entrance end facet and/or said exit end facet.

10. A nonlinear-optic waveguide device according to claim 3, wherein said core has a slit for suppressing dispersion in the nonlinear-optic waveguide device.

11. A nonlinear-optic waveguide device according to claim 3, wherein said core has a diffraction grating for suppressing dispersion in the nonlinear-optic waveguide device.

12. A nonlinear-optic waveguide device according to claim 3, wherein said core has a ratio of vertical and horizontal dimensions, said ratio being at least 1.2.

13. A white pulse light source comprising:
a nonlinear optical device according to claim 3; and
a pulse light source for generating a light pulse to be introduced into the entrance end facet of said nonlinear optical device, said light pulse having a peak power of at least several hundreds W and a pulse duration of at most 10 ps.

14. A white pulse light source according to claim 13, wherein said pulse light source comprises a mode-locked semiconductor laser.

15. A wavelength-variable pulse light source comprising:
a white pulse light source according to claim 13; and
wavelength-variable light filtering means for extracting a predetermined wavelength component from a white light pulse generated by said white pulse light source.

16. A nonlinear-optic waveguide device comprising:
an entrance end facet for introducing a light pulse thereinto;
a thin-wire core having a cross-sectional area of at most 1 μm² in at least a central device region, said core having a slit for suppressing dispersion in the nonlinear-optic waveguide device;
a cladding, said core and said cladding having a refractive index difference of at least 1; and
an exit end for emitting said light pulse propagated through said core,
wherein said slit has a size, including a width and a depth, set such that a spreading of said light pulse on a time axis due to the dispersion in the nonlinear-optic waveguide device is reduced to at most ⅕ of a pulse duration of said light pulse.

17. A nonlinear-optic waveguide device according to claim 16, wherein said core has an anisotropic shape.

18. A nonlinear-optic waveguide device comprising:
an entrance end facet for introducing a light pulse thereinto;
a thin-wire core having a cross-sectional area of at most 1 μm² in at least a central device region, said core having a diffraction grating for suppressing dispersion in the nonlinear-optic waveguide device;
a cladding, said core and said cladding having a refractive index difference of at least 1; and
an exit end facet for emitting said light pulse propagated through said core,
wherein said diffraction grating has a size, including a periodic interval, set such that the spreading of said light pulse on a time axis due to the dispersion in the nonlinear-optic waveguide device is reduced to at most ⅕ of a pulse duration of said light pulse.

19. A nonlinear-optic waveguide device comprising:
an entrance end facet for introducing a light pulse thereinto;
a two-dimensional photonic crystal slab having a linear defect disposed as a core therein;
a cladding including a crystal lattice disposed in sandwiching relation to the linear defect of said two-dimensional photonic crystal slab; and
an exit end facet for emitting said light pulse propagated through said core;
wherein the product of the thickness and a lattice constant of said two-dimensional photonic crystal slab is at most 1 μm², and said core and said cladding have a refractive index difference of at least 1,
wherein said two-dimensional photonic crystal slab has a structure, including said lattice constant, set such that dispersion in the nonlinear-optic waveguide device is reduced to at most ⅕ of a pulse duration of said light pulse.

20. A nonlinear-optic waveguide device according to claim 19, wherein said two-dimensional photonic crystal slab is made of silicon.

21. A nonlinear-optic waveguide device according to claim 19, wherein the thickness and the lattice constant of said two-dimensional photonic crystal slab have different values.

22. A nonlinear-optic waveguide device comprising:
an entrance end facet for introducing a light pulse thereinto;
a two-dimensional photonic crystal slab having a linear defect disposed as a core therein;
a cladding including a crystal lattice disposed in sandwiching relation to the linear defect of said two-dimensional photonic crystal slab; and
an exit end facet for emitting said light pulse propagated through said core;
wherein the product of the thickness and a lattice constant of said two-dimensional photonic crystal slab is at most 1 μm², and said core and said cladding have a refractive index difference of at least 1,
wherein said two-dimensional photonic crystal slab has a structure, including said lattice constant, set such that the group velocity of said light pulse propagated through the nonlinear-optic waveguide device is at most $1/10$ of the velocity of light in vacuum.

* * * * *